(12) United States Patent
Hinterwaldner et al.

(10) Patent No.: US 7,260,889 B2
(45) Date of Patent: Aug. 28, 2007

(54) COATING COMPOSITIONS HAVING ANTISEIZE PROPERTIES FOR DISASSEMBLABLE SOCKET/PIN AND/OR THREADED CONNECTIONS

(75) Inventors: Rudolf Hinterwaldner, Moosach (DE); Karol Konat, München (DE); Thomas Trübenbach, Germering (DE); Anselm Weckerle, Fürstenfeldbruck (DE)

(73) Assignee: Omnitechnik Mikroverkapselungsgesellschaft mbH (DE)

( * ) Notice: Subject to any disclaimer, the term of this patent is extended or adjusted under 35 U.S.C. 154(b) by 601 days.

(21) Appl. No.: 10/915,926

(22) Filed: Aug. 11, 2004

(65) Prior Publication Data
US 2005/0009711 A1    Jan. 13, 2005

Related U.S. Application Data

(62) Division of application No. 09/534,752, filed on Mar. 24, 2000, now Pat. No. 6,846,779.

(51) Int. Cl.
*B23P 19/04* (2006.01)
*C10M 107/00* (2006.01)

(52) U.S. Cl. .......... 29/700; 508/118; 508/131; 508/167; 508/168; 508/181; 508/184; 508/590; 508/591

(58) Field of Classification Search .......... 29/700
See application file for complete search history.

(56) References Cited

U.S. PATENT DOCUMENTS

| | | | |
|---|---|---|---|
| 4,104,073 A * | 8/1978 | Koide et al. | 106/18 |
| 4,303,537 A * | 12/1981 | Laepple et al. | 508/118 |
| 4,525,287 A * | 6/1985 | Carstensen | 508/120 |
| 4,711,733 A * | 12/1987 | Kanda et al. | 508/118 |
| 5,049,289 A * | 9/1991 | Jacobs | 508/128 |
| 5,093,015 A * | 3/1992 | Oldiges | 508/124 |
| 5,180,509 A * | 1/1993 | Jacobs | 508/126 |
| 5,431,831 A * | 7/1995 | Vincent | 508/116 |
| 5,547,503 A * | 8/1996 | Oldiges et al. | 106/287.18 |
| 5,885,941 A * | 3/1999 | Sateva et al. | 508/121 |
| 5,895,776 A * | 4/1999 | Aurin et al. | 508/163 |
| 6,620,460 B2 * | 9/2003 | Oldiges et al. | 427/409 |
| 6,846,779 B1 * | 1/2005 | Hinterwaldner et al. | 508/118 |
| 6,960,555 B2 * | 11/2005 | Anthony et al. | 508/136 |
| 7,091,161 B2 * | 8/2006 | Oldiges et al. | 508/154 |

FOREIGN PATENT DOCUMENTS

| | | | |
|---|---|---|---|
| DE | 3 021 263 | * | 12/1981 |
| DE | 29 48 405 | * | 4/1983 |
| DE | 198 33 847 | * | 2/2000 |
| EP | 246 564 A | * | 6/1987 |
| EP | 0 521 825 | * | 6/1992 |
| GB | 1035566 | * | 9/1964 |

* cited by examiner

*Primary Examiner*—Ellen M. McAvoy
(74) *Attorney, Agent, or Firm*—Niro, Scavone, Haller & Niro

(57) ABSTRACT

The present invention relates to a coating composition comprising a) at least one binder and b) at least one substance which releases gases at elevated temperature, and c) at least one friction-reducing additive.

With the aid of the coating compositions of the invention it is possible to fill gaps in the case of socket/pin couples or threaded-part couples for the purpose of sealing and locking. The use of the coating compositions allows disassembly of the parts without danger of seizing or jamming.

18 Claims, No Drawings

COATING COMPOSITIONS HAVING ANTISEIZE PROPERTIES FOR DISASSEMBLABLE SOCKET/PIN AND/OR THREADED CONNECTIONS

This is a Divisional of application Ser. No. 09/534,752, filed Mar. 24, 2000 now U.S. Pat. No. 6,846,779.

Coating compositions having antiseize properties for disassemblable socket/pin and/or threaded connections Subject matter of the present patent application are coating compositions having antiseize properties for disassemblable socket/pin connections and/or threaded connections.

The requirements imposed on the locking and sealing of socket/pin and threaded connections of all kinds are becoming more and more stringent, throughout the world, as a result of increased product liabilities and product safety. Since the functions of "locking" and/or "sealing", especially in the case of structural threaded connections, have to be ensured over life cycles which vary in length, the properties of the polymeric thread-locker and thread sealant must be adapted to the divergent stresses due to environment, aging, chemicals and/or temperatures so that, if appropriate, they remain disassemblable. Disassemblable socket/pin and threaded-part couples locked and sealed with polymeric compositions are required, furthermore, to possess specific breakaway and prevailing torques, as laid down in standards, specifications and the like. Such requirements are encountered, inter alia, in mechanical engineering, land, air and marine craft construction, and, more recently, in architectural construction as well.

In contrast, the loosening and tightening of gap-filled socket/pin and threaded connections continues to be very problematic and has not been satisfactorily solved. The reasons for this lie, for example, in the seizing of the socket/pin and/or threaded-part couples in the set polymer compositions in the gaps. This seizing also occurs with "under-head" connections, e.g., at the screw head. Further negative implementing variables result in the case of gap-filling with polymeric compositions when positive and frictional connection with sufficient cohesive strengths, and or integral connection by way of adhesive bonding forces at the interfaces are formed. Depending thereon, seizing varies in its intensity during loosening and tightening.

Since seized socket/pin and/or threaded connections of elements, workpieces, apparatuses and the like cannot be used again, for a variety of reasons, in industrial, commercial and craft practice, they have to be replaced by expensive new parts, whose acquisition is timeconsuming and costly. These are prime disadvantages especially for the areas of repair and maintenance in a very wide variety of sectors, especially in the case of threaded-part couples made from high-value materials, e.g., stainless steels and special-production items. Additional disadvantages occur in connection with material recycling, if the elements of the assembly consist of different materials.

In the past there has been no lack of efforts among manufacturers of threadlockers and thread sealants to develop suitable products having antiseize properties for craft, commercial and industrial practice. Such attempts have included:

producing specific slip properties at the interfaces by means of additives which reduce the friction coefficient, such as powders of graphite, molybdenum disulfide, polyolefin and polytetrafluoroethylene, for example, without a tendency to seize following breakaway and subsequent tightening of the threaded connection. However, it has been necessary to reject such additives as sole antiseize agents, since they did not ensure sufficient thread locking;

enhancing and maintaining the lubricity by means of wax coatings on the surface of the threads provided beforehand with a locking and sealing composition (EP 0 480 103 A1).

These facts and findings alone demonstrate that friction-reducing substances are unsuitable as sole antiseize additives in gap-filling polymer compositions for socket/pin and/[lacuna] threaded connections, since they act primarily as lubricants and slip agents.

The customary binders in coating compositions used to fill and seal gaps and/or threaded-part couples lead to seizing when such connections are loosened and tightened. The reasons for this lie, inter alia, in the polymer matrix of the binder, because a) during installation and setting and/or b) as a result of functional stresses with long-term aging, and exposure to chemicals, water and/or temperature they are altered to such an extent that seizing takes place, or is promoted, during loosening and tightening.

These circumstances are observed, or occur, in particular when the temperature loads are >250° C.,>300° C., or >400° C. for hours, days, months or more. At the high temperatures and long periods of load, the organic binder matrix is degraded, carbonized in the gap, and often "sintered". It is precisely these "coking residues" which further promote seizing on loosening and tightening.

It is true that the patent literature describes adhesives for producing disassemblable adhesive bonds. However, these tasks and functions of the set adhesive films in the bonded joint cannot be transferred to the set polymer films in the gaps of the socket/pin and/or threaded-part couples. While in the case of disassemblable adhesive bonds it is the weakening of the adhesion forces at the interfaces and/or of the cohesive strengths in the adhesive film that is critical for disassembly, in order to be able to separate an adherend easily, this is not the case with set gap-filling compositions. The problems associated with the loosening and/or tightening of socket/pin and/or threaded-part couples only begin in this process with the destruction of the set gap-filling compound in the annular gap, because the parts seize against one another and jam and the destroyed gap-filling compound, in addition, is generally the cause of a high coefficient of friction.

Heat-curable adhesives based on epoxy resin, as described in Patent Applications DE-A 29 48 405 and DE-A 30 21 263, are unable to solve the problem, especially in the case of mass products, not least for reasons of economics and of handling. This applies preferentially to an adhesive sheet, such as the so-called "sheet adhesive FM 123-5" from American Cyanamid Co., which can in any case be transported and stored only with cooling (<−5° C.).

DE 198 33 847 A describes the disassembly of adhesive bonds by thermal release of gases within the adhesive bond. In the case of adhesive bonds, in a laminate, for example, the problem of seizing naturally does not occur. Nor is it possible with the proposals of DE-A-198 33 847 to produce any gap-filling polymer compositions which on loosening and tightening do not seize, do not jam, and possess sufficient slip properties at the respective interfaces. Furthermore, bonded joints must be designed such that the adhesive films, once set, are able to accommodate and/or transfer forces uniformly. The bonded joints must be dimensioned such that, as far as possible, a thin, homogeneous adhesive film is able to form in the space of the joint in order that the stress peaks within the bonded assembly remains small. In contrast, in the case of socket/pin and threaded-part couples, different gap tolerances are to be expected, and so the requirements imposed on a gap-filling polymer composition are different in comparison to an adhesive. The proposal of DE 198 33 847 A is therefore unsuitable for socket/pin or threaded connections.

The object on which the present invention is based is to provide a coating composition which on the one hand is suitable for filling, sealing and/or locking socket/pin and/or threaded-part couples and on the other hand reduces the danger of seizing and jamming when these couples are loosened and/or tightened.

It has surprisingly now be found that this object is achieved with a coating composition which comprises, in addition to a binder suitable for gap filling in the case of socket/pin and/or threaded-part couples, an antiseize agent which releases gases when the temperature is raised, and a friction-reducing additive.

The present invention therefore provides a coating composition for filling, sealing and/or locking disassemblable socket/pin and/or threaded-part couples which has antiseize properties and comprises
a) at least one chemically reacting and/or inert (physically setting) binder
b) at least one substance which releases gases at elevated temperature.
c) at least one friction-reducing additive, and
d) if desired, further, customary additives.

Component a)

The binders a) are chemically reacting monomers or polymers and/or physically setting polymers. The chemically reacting binders are curable or crosslinkable by means of cold, heat and/or radiation; for example, by polyaddition, addition polymerization, and/or polycondensation. Where polymers or copolymers are involved, they generally have a relatively low molecular weight in the range from about 300 to about 25,000. Reactive binders are, in particular, compounds containing ethylenically unsaturated groups, examples being (meth)acrylic esters, allyl esters, unsaturated polyesters, epoxy resins, polyisocyanates, polyurethanes, polysulfides, silicones, etc.

With the reactive binders it is possible to formulate one-, two- and multi-component systems which under the respective conditions of use are reactivated and cure or crosslink. Preference is given to binders which cure under anaerobic conditions, examples being the monomers or polymers containing ethylenically unsaturated groups, epoxy resins, polyurethanes containing isocyanate groups, etc. A special position in this group is occupied by the reactive melt compositions, since they set both physically and chemically by means of atmospheric moisture. They are preferably processed in solvent-free form. On this basis it is also possible to formulate reactive "1 K systems" (one-component systems), where at least one of the reaction components is in microencapsulated form and only under application conditions are the microcapsules destroyed and is the setting reaction initiated. The microencapsulated systems are suitable advantageously for the pretreatment of the threads with the coating compositions of the invention.

In the case of the physically setting sytems, the polymers are already in their polymeric end states and are processed from their solutions, dispersions and/or melts. Aqueous solutions and dispersions are preferred. The physically setting binders comprise, in particular, thermoplastic polymers which already possess a relatively high molecular weight, generally in the range from 5000 to 500,000. Examples of these are polyolefins, polyesters, polyamides, polyimides, vinyl polymers, polyurethanes, polyvinyl halogens, polycarbonates, and copolymers thereof. These polymers may contain, in copolymerized form, units having functional groups, such as hydroxyl, carboxyl or amino groups. The functional groups raise the polarity and thus strengthen the adhesive forces between binder and the material of the thread. Examples of suitable units containing functional groups are (meth)acrylic acid, hydroxyethyl (meth)acrylate or aminoethyl (meth)acrylate. Inert binders also include nonreactive melt substances. Preference is given to those whose melting and softening range is at least 10° C. below the decomposition temperature of the gas-releasing substances.

Also suitable, furthermore, are inorganic binders, which are used preferentially in high-temperature-resistant coating compositions. Binders of this kind are, in particular, hydraulically setting substances, such as cements of all kinds, lime, gypsum, waterglasses, especially sodium and/or potassium waterglasses having weight ratios of $SiO_2$: $M_2O$ in the range from 20:5 to 40:15 parts by weight (M=Na, K, Li). Other inorganic binders which can be used are the binders described in EP-A-246 564, based on sodium silicate and aluminum oxide.

For the purpose of simplification, the text below refers generally to "setting". By this is meant both the physical setting, such as evaporation of solvent, water or the like, the cooling of the melt compositions, and the chemical hardening, crosslinking and the like in the case of the chemically reacting backbone binders.

Component b)

By means of component b) it is possible in the polymeric composition to produce foam structures or porous structures which permit loosening and/or tightening of the threaded-part couple without the risk of seizing or jamming.

Component b) comprises low molecular mass, inorganic, organometallic or organic substances which are solid at room temperature and which, when the temperature is raised, release gases spontaneously by undergoing decomposition and/or by initiating conversion reactions and/or by triggering initial ignitions in such a way that at least of the decomposition products and/or cleavage products is a gas. The gas yield should be preferably $\geq 50$ ml/g, in particular $\geq 70$ ml/g and, with particular preference, $\geq 90$ ml/g. The temperature at which component b) releases gases is generally $\geq 50°$ C., in particular $\geq 80°$ C. and preferably $\geq 100°$ C. The gas released brings about the formation of foam structures or porous structures in the set coating composition, which facilitate the disassembly of the parts and hinder or prevent seizing and jamming on tightening.

The choice of the substance which releases gases at elevated temperature is made in accordance with the conditions when applying and setting the coating composition and the operating conditions to which the component treated with the coating composition is subjected. In the majority of cases, the substance is chosen such that under the conditions when applying and setting the coating composition and under the operating conditions of the component it releases essentially no gases but instead does so only at a temperature higher than the temperature during application and setting and in the operational state. This temperature is preferably at least 20° C. and in particular at least 50° C. higher— than the highest temperature to which the substance is exposed during application and setting of the coating composition or during operation of the component.

In a number of special cases, such as with filled gaps, for example, which are exposed under operating conditions to very high temperatures (from 250 to 1000° C.), it has surprisingly been found advantageous for at least partial amounts of the gas-releasing substances to be destroyed as early as during setting and/or on attainment of the operating conditions. Even a partially present porous structure promotes loosening and tightening—even after long-term temperature exposure—and reduces seizing and jamming.

The substances which release gases when the temperature is raised can be used in the form of single substances or in the form of substance mixtures. In the case of substance mixtures, the individual components may be inert and may initiate a gas-forming reaction only when mixed. In this case, one of the components is preferably micoencapsulated, the particle size of the microcapsules being <100 μm, in particular <50 μm.

Highly homogeneous gas bubble formation in the gap of the threaded connection is desirable, since by this means the disassembly operation is assisted. This is particularly the case when the coating composition, on setting, has resulted not only in positive connection but also in integral connection by way of adhesive bonding forces at the interfaces in the gap. In order to obtain homogeneous gas bubble formation, component b) is distributed very uniformly in the coating composition.

The amount of component b) is dependent on the substance and on the application, and is also codetermined by the volume of gas which is liberated on decomposition. The amount must on the one hand be sufficient to bring about the effective formation of foam structures or porous structures in the fully cured coating composition. On the other hand, it must not be so high that the locking and sealing properties of the coating composition are adversely affected. In general, the amount of component b) is in the range from 0.5% by weight to 50% by weight, preferably from 1% by weight to 25% by weight, based on the solids fraction consisting of binders and, if present, of filler. A special position is occupied by the inorganic gas-releasing substances—as a consequence of their higher specific weights. In this case, added amounts of up to 100% by weight, based on solids fractions, may be employed.

Component b) comprises, in particular, blowing agents as known from the foam material industry. In accordance with the invention, components b) employed are in particular those which, as gases, evolve essentially nitrogen, carbon dioxide and/or carbon monoxide. Examples of useful components b) are:

(1) Azo compounds, such as azodicarboxamide, azobisisobutyronitrile or 1,1'-azobisformamide. The decomposition temperature of azodicarboxamide (205-215° C.) can be lowered down to 155° C. by means of so-called kickers. Kickers which can be used are metal compounds, such as zinc oxide, zinc stearate, Ba—Zn and K—Zn systems, or organic compounds, examples being acids, bases or urea.

(2) Hydrazine derivatives, such as 4,4'-oxybis (benzenesulfohydrazide), diphenyl sulfone 3,3'-disulfohydrazide, diphenylene oxide 4,4'-disulfohydrazide, trihydrazinotriazine or p-tolylenesulfonyl semicarbazide.

(3) Nitroso compounds, such as N,N'-dinitroso-dimethylterephthalamide.

(4) Tetrazoles, such as 5-phenyltetrazole.

(5) Carboxylic acid and carboxylic acid derivatives, such as malonic acid, α-ketocarboxylic acids, β-ketocarboxylic acids, $\alpha\alpha\alpha$-tri-halocarboxylic acids, glyceridecarboxylic acids, β, γ-unsaturated carboxylic acids, β-hydroxycarboxylic acids, β-lactones or carboxylic anhydrides, such as isatoic anhydride.

(6) Organic peroxo compounds, such as peroxycarboxylic acids, examples being peroxyacetic acid or peroxybenzoic acid, and their alkali metal salts and ammonium salts. The peroxo compounds are employed preferably in microencapsulated form.

(7) Inorganic carbonates and hydrogen carbonates, especially alkali metal and alkaline earth metal carbonates, such as sodium carbonate, calcium carbonate, and alkali metal or alkaline earth metal hydrogen carbonates, such as sodium hydrogen carbonate, calcium hydrogen carbonate, and also ammonium carbonate and ammonium hydrogen carbonate. When using inorganic carbonates and hydrogen carbonates, higher temperatures are required for gas elimination than in the case of the abovementioned organic compounds. These temperatures are generally >400° C., preferably >500° C., and especially >600° C.

(8) Inorganic peroxo acids and their salts, such as alkali metal peroxocarbonates and alkali metal peroxosulfates.

(9) Explosive substances, such as the nitrates of glycerol, ethylene glycol, diethylene glycol, pentaerythritol and ethylenediamine, nitro-cellulose, trinitrotoluene, picric acid, tetryl, hexogen, octogen, nitroguanidine, ammonium perchlorate and methylamine nitrate. With particular preference, the explosive substances are employed in microencapsulated form.

Particularly preferred explosive substances are hexogen (hexahydro-1,2,3-trinitro-1,3,5-triazine), picric acid (2,4,6-trinitrophenol) and tetryl (N-methyl-N, 2,4,6-tetranitroaniline). Further explosive substances which can be used are described in Ullmanns Encyclopedia of Industrial Chemistry, Vol. A10, p. 143 ff., 1987.

(10) Substances which expand on heating, which are generally present in the form of microspheres, an example being the commercial product obtainable under the brand name "Expancel® Microspheres". These microspheres are based on a polyvinylidene chloride shell and contain in the core monomeric acrylonitrile, (meth)acrylates and isobutane as expansion agents. The expansion of these substances is determined in particular by the level of heating. The expanding substances can be used alone as component b) or as an addition to other components b).

Preferred components b) are the compounds stated above under (1), (2), (5), (6), (7) and (9).

The temperature at which the gas evolution of component b) takes place depends on the substance in question and can vary within a wide range. In addition, the temperature may be modified by means of additions such as metal oxides, examples being zinc oxide, titanium dioxide, aluminum oxide, etc. In this way it is possible to adjust the decomposition temperature in a desired manner. For some of the components b) which can be used in accordance with the invention, the decomposition range and the gas yield are compiled in Table 1 below. The table shows that through the choice of the appropriate component b.) it is possible to adjust the decomposition temperature in accordance with what is required.

TABLE 1

Decomposition range in gas yield of compounds which release gases when the temperature is raised.

| Chemical Name | Decomposition range in air [° C.] | Gas yield [ml/g] |
| --- | --- | --- |
| Azodicarboxamide | 205 to 215 | 220 |
| Modified Azodicarboxamide | 155 to 220 | 150 to 220 |
| 4,4'-Oxybis-(benzenesulfohydrazide | 150 to 160 | 125 |
| Diphenyl sulfone 3,3'-disulfohydrazide | 155 | 110 |
| Diphenyl oxide 4,4'-disulfohydrazide | 175 to 180 | 120 |
| Trihydrazinotriazine | 275 | 225 |
| p-Tolylenesulfonyl semicarbazide | 228 to 235 | 140 |
| 5-Phenyltetrazole | 240 to 250 | 190 |
| Isatoic anhydride | 210 to 225 | 115 |
| Calcium carbonate | >400 | ~200 |
| Sodium carbonate | >100 | ~100 |
| Sodium Hydrocarbonate | >50 | ~100 |

In many cases it is advantageous to use component (b) in microencapsulated form. This applies in particular to the organic peroxo compounds, the on organic peroxo acids, and the explosive substances.

Component c)

The friction-reducing additive serves to improve the slip at the interfaces of the parts and of the binder particles after breakaway. The friction-reducing additives are generally in the form of solid particles. The particles of component b) may also have been coated with the friction-reducing additives. Preferred friction-reducing additives are polyolefins, such as polyethylene and polypropylene; fluorinated polyolefins, such as polytetrafluoroethylene; graphite; and metal sulfides, such as molybdenum disulfide.

The amounts of friction-reducing additives are largely determined by the application torque and predetermined breakaway and/or prevailing torques. They are generally between 1 and 200% by weight, preferably from 2 to 150% by weight, in particular from 5 to 120% by weight, based on the solids fraction comprising binder and, where present, filler. Surprisingly, it has been found that by the use of components b) and c) the seizing or jamming of the socket/pin parts or threaded parts, respectively, on breakaway or tightening is essentially avoided and that the strength of the socket/pin and/or threaded connections, despite the presence of component c), is not impaired.

Component d)

In addition to components a)-c), the coating compositions of the invention may comprise further, customary additives as component d). Examples thereof are solvents, such as glycols, esters, hydrocarbons, wetting agents, surfactants, leveling agents, fillers ($BaSO_4$, $CaSO_4$, kaolins, silicates, aluminum oxide, zinc oxide, zinc phosphate, calcium phosphate), thixotropic agents, rheology modifiers, etc.

The coating compositions of the invention can be present in an organic solvent, for example, in one of the abovementioned solvents, as an aqueous system in the form of an emulsion, dispersion or solution or in solvent-free form, e.g., in the form of melt compositions. Particular preference is given to solvent-free coating compositions, in which case the monomeric reactive binders are used with advantage as component a). Alternatively, aqueous coating compositions comprising inert polymers as binders may be advantageously employed.

The coating compositions of the invention having antiseize properties are suitable both for pretreatment and for application to the assembly site of socket/pin and threaded-part couples. In the case of mass production products, pretreatment is the most rational and most secure mode, since it is ensured that only pretreated part of standardized quality are processed at the assembly location.

The application of the coating compositions of the invention takes place by application to the parts to be locked and/or sealed. This is done using customary processes, examples being spray processes, dip processes, brushing processes, etc. In the case of coating compositions containing solvent or water, there may be a subsequent drying step.

After the joining of sockets and pins or threaded parts of which at least one part has been provided with the coating composition of the invention, the lock or seal is formed in the gap of socket pins or threads, as described above, by setting of the binder. When the lock or seal is to be loosened, the antiseize property is activated. This can be done before or after the breakaway of the socket/pin or threaded parts. For this purpose, the parts are exposed to a temperature which is equal to the decomposition temperature of component b) (the temperature at which component b) releases gases) or lies above this temperature. This can be done in conventional manner by heating. For this purpose it is preferred to accommodate, homogeneously, electrically conductive and/or thermally conductive substances in the coating composition. Substances of this kind can be present in the form of fibers, particles, microbeads, hollow microbodies and/or wires made of metal or other electrically or thermally conductive substances. Examples of substances which can be used are thin, small metal flakes, metal wires, graphite fibers or other carbon fibers, microbeads made of inorganic substances or polymers which are coated with conductive substances, examples being silver-coated silicates, and hollow microbodies. As a result of the gas formation brought about by the decomposition of component b), there is a reduction in the cohesive and, if appropriate, adhesive strength of the gap-filling, set coating composition. As a result, the danger of seizing or jamming of the parts at breakaway is avoided, so that the parts can be separated without problems and used again.

EXAMPLES

The invention is illustrated with reference to Examples 1 to 13 (Table 2). It is not, however, limited to these examples.

Preparation of the Coating Compositions a) Physically Setting Compositions Based on Aqueous Dispersions and/or Waterglass.

The polymer and waterglasses are present at different solids contents (20 to 70% by weight). The amounts required in each case are charged to the mixing vessel of a planetary mixer with disperser, and the necessary pH is established if appropriate. Filler and rheological agents are slurried in water and pasted up before being added in portions to the dispersions and/or waterglasses and mixed in thoroughly. Preservatives and other additives are incorporated preferably by way of a so-called masterbatch. The addition of gas-releasing substances and of the friction-reducing additives takes place preferably at the end. As soon as these substances have been mixed in thoroughly, the composition is dispersed homogeneously using the disperser, and subsequently the final properties, such as viscosity, pH, are adjusted where necessary.

b) Melt Compositions

For melt compositions the raw materials can be prepared batchwise in a heatable melt compounder (Z-arm kneader) or continuously in a heatable 1- or 2-screw extruder. The binders are selected in accordance with the decomposition temperatures of the gas-releasing substances. The melting point or softening range of the binder is in each case from about 20 to 25° C. below the decomposition point of the gas-releasing substances, in order to maintain their activity.

The raw-material granules of the binders are charged to the heated melt compounder and are heated and melted within 30 minutes. Subsequently, in portions, the respective amount of filler is incorporated into the melt, which is then kneaded to give a homogeneous composition. Finally, the gas-releasing and friction-reducing additives are incorporated rapidly and homogeneously.

The finished melt composition can be converted into small unit forms by 3 different process steps:

production of strands by cooling in a cooling bath, which are subsequently cut into sticks or granulated by means of a chopping device production of chips, drops, pearls and the like by means of customary devices which fall onto a cooled belt production of sticks by pouring into cooled molds (similar to the production of lipsticks)

c) Chemically Reacting Compositions

The chemically reacting compositions comprise one-, two- and multi-component systems, the first two being used predominantly. In the case of the two-component systems (epoxides, polyurethanes), the two components are mixed separately. In the case of the one-component systems, the products are either so-called moisture-curing products or products where one reactive component is microencapsulated.

For preparation it is possible, in turn, to use planetary mixers comprising dispersers. First of all, the binders or the co-reactant, e.g. hardener, is introduced and the filler is incorporated homogeneously. The gas-releasing substances and friction-reducing additives can be incorporated either into one or separately into both components, provided they remain inert with respect to the reactive components during storage.

Moisture-curing reactive melt compositions, such as those based on polyurethane, for example, can be prepared in analogy to the melt compositions.

In the case of compositions containing micro-encapsulated constituents, it is important to carry out incorporation at the end, in order to avoid any damage to the capsule walls by the shear forces which arise during mixing.

Application of the Coating Compositions

Threaded-part couples were treated with the compositions of Examples 1 to 13.

Selection of the test elements:

stainless steel bolts, M 10×35, A2-70, DIN 933 stainless steel nuts, M 10, A2-70,DIN 934 steel bolts, M 10×35, 8.8 (quenched and drawn black steel) DIN 933 steel nuts, M 10 (quenched and drawn black steel) DIN 934

Before application, all test elements are cleaned with an aliphatic hydrocarbon and subsequently stored for 24 hours for 24 hours.

For the coating of the thread turns of the cleaned test bolts, they were mounted individually on a horizontally rotating magnetic block and the composition was poured over at least 6 thread turns. Following homogeneous distribution of the composition, the test bolt was removed and stored for 24 hours at 23° C. The compositions containing water and solvent were able to dry simultaneously.

For coating with melt compositions (Example 7 and 9), the sticks produced were inserted into a manual hot-melt adhesive gun and were heated to the processing temperature of 140° C. (Example 7) and 180° C. (Example 9). The test bolts to be coated were preheated to about 60 to 70° C. using a hot-air hairdryer.

In the case of the chemically reacting compositions, homogeneous mixtures were prepared from the reaction components in the equivalents ratios and test elements were treated with these mixtures within the pot life. During the pot life, the reaction temperature of the compositions from Examples 10 to 12 remained below 60° C.

Example 13 relates to an acrylate-based threadlocking and thread sealing composition comprising microencapsulated acrylate and peroxide, to which 5% by weight of microencapsulated hexogen (additive G10) and friction-reducing additives R1 and R2 were added.

Each composition was used to treat 10 test bolts which after coating were stored at 23° C. for 24 hours.

The screwing-on of the test thread and the tensioning of the threaded connection were carried out at a constant rotary speed onto the coated external thread. Using the torque wrench, the counterthread was tightened until the predetermined tightening torque ($LM_t$) was reached. The test elements were stored at 23° C. for a further 24-hours for setting of the composition. In parallel, for comparison, a similar number of test elements were treated with compositions in accordance with Examples 1 to 13 but containing no gas-releasing or friction-reducing additives.

To test effectiveness, the test elements were subjected before testing to temperature exposure—as is laid down in the art—which is referred to as thermal stressing. The results of the breakaway and prevailing torques determined are summarized in Table 3. The test results are the arithmetic mean of in each case 10 test elements.

The breakaway and prevailing torques of the test elements from Examples 1 to 13 were determined on the bolt test bench (model No. 5413-4102 from the company Schatz). The rotary speeds were as follows when determining the

| | |
|---|---|
| breakaway torque ($LM_b$): | 5 rpm |
| prevailing torque ($LM_f$): | 20 rpm |
| unscrewing: | 50 rpm. |

TABLE 2

Compositions

Example No. (parts by weight of solids)

| Raw materials 1) | 1 | 2 | 3 | 4 | 5 | 6 | 7 | 8 | 9 | 10 | 11 | 12 | 13 |
|---|---|---|---|---|---|---|---|---|---|---|---|---|---|
| Binder basis | | | | | | | | | | | | | |
| a) physically setting aqueous dispersion | | | | | | | | | | | | | |
| PVC | — | — | — | 45.0 | 45.0 | — | — | — | — | — | — | — | — |
| Acrylates and CP | 26.5 | 52.6 | 45.0 | — | — | — | — | — | — | — | — | — | — |
| Polyurethanes | — | — | — | — | — | 30.0 | — | — | — | — | — | — | — |
| Ethylene-vinyl acetate CP | — | — | — | — | — | — | — | 40.0 | — | — | — | — | — |
| Waterglass | — | — | 55.0 | — | — | — | — | — | — | — | — | — | — |
| Melt compositions | | | | | | | | | | | | | |
| Polyamide and CP | — | — | — | — | — | — | — | — | 45.0 | — | — | — | — |
| Ethylene-vinyl acetate CP | — | — | — | — | — | — | 70.0 | — | — | — | — | — | — |
| b) Chemically reacting | | | | | | | | | | | | | |
| Epoxides | — | — | — | — | — | — | — | — | — | 35.0 | — | — | — |
| Polyurethanes | — | — | — | — | — | — | — | — | — | — | 30.0 | — | — |
| Silicones | — | — | — | — | — | — | — | — | — | — | — | 35.0 | — |
| Acrylates and CP | — | — | — | — | — | — | — | — | — | — | — | — | 42.0 |
| Fillers/rheology agents | 73.5 | 47.4 | — | 55.0 | 55.0 | 70.0 | 30.0 | 60.0 | 55.0 | 65.0 | 70.0 | 65.0 | 58.0 |
| Gas-releasing additives | | | | | | | | | | | | | |
| Additive G 1 | — | 2.0 | — | 7.0 | — | — | — | — | — | — | — | — | — |
| Additive G 2 | — | — | — | — | 8.0 | — | — | — | — | — | — | — | — |
| Additive G 3 | — | — | — | — | — | 14.0 | — | — | — | — | — | — | — |
| Additive G 4 | — | — | — | — | — | — | 13.5 | — | — | — | — | — | — |
| Additive G 5 | — | — | — | — | — | — | — | — | 7.0 | — | — | — | — |
| Additive G 6 | — | — | — | — | — | — | — | — | — | — | — | 20.5 | — |
| Additive G 7 | — | — | — | — | — | — | — | 8.5 | — | — | — | — | — |
| Additive G 8 | — | — | — | — | — | — | — | — | — | — | — | 6.0 | — |
| Additive G 9 | — | — | — | — | — | — | — | — | — | — | 2.7 | — | — |
| Additive G 10 | — | — | — | — | — | — | — | — | — | — | — | — | 5.0 |
| Additive G 11 | — | — | — | — | — | — | — | — | — | 1.8 | — | — | — |
| Additive G 12 | — | — | — | — | — | — | — | — | — | — | — | — | — |
| Additive G 13 | 9.0 | 11.0 | 83.0 | — | — | — | 3.5 | — | — | — | — | — | — |
| Friction-reducing additives (lubricants) | | | | | | | | | | | | | |
| Additive R 1 | 18.0 | — | 42.0 | — | — | 12.0 | — | 10.0 | — | — | 5.3 | 10.5 | 8.0 |
| Additive R 2 | — | — | — | 6.0 | 6.0 | — | 3.5 | — | 8.0 | — | — | 2.0 | 2.0 |
| Additive R 3 | 19.0 | 58.5 | 130.0 | — | — | 10.0 | 5.5 | — | — | 8.2 | 12.0 | — | — |
| Additive R 4 | — | — | — | — | — | — | — | 2.0 | 2.0 | — | — | — | — |

Physically setting binders:
PVC (polyvinyl chloride): Vinnol-Dispersion 50 from Wacker-Chemie
Acrylates and CP: Acronal®85D from BASF AG
Polyurethanes: Dispercolle U 54 from Bayer AG
Ethylene-vinyl acetate-CP: Vinnapas®-Dispersion EP 1 from Wacker-Chemie
Waterglass: Sodium waterglass 37/40 Be from Henkel KgaA
Melt compositions:
Polyamide and CP: PEBAX® FROM Elf-Atochem
Ethylene-vinyl acetate-CP: ELVAX® from DuPont, Wilmington, Del.
Chemically reacting binders:
Epoxides: Epikote/Epicure®-System from Shell Chemical
Polyurethanes: Desmodur/Desmophene from Bayer AG
Silicones: Siloprene from GE/Bayer GmbH
Acrylates and CP: PRECOTE®, microencapsulated epoxyacrylate CP from Omnitechnik Mikroverkapselungs GmbH Fillers/rheology additives: Aluminum oxide.
Gas-releasing additives (G 1 to G 13):
G 1=Azodicarboxamide
G 2=Azodicarboxamide, modified
POROFOR® from BAYER AG
G 3=4,4' Oxybis(benzenesulfohydrazide), Manufacturer: Uniroyal Chemical, USA
G 4=Diphenylene oxide-4,4'disulfohydrazide Manufacturer: Bayer AG
G 5=Phenyltetrazole Manufacturer: Stepan Chemical Co., USA
G 6=Isatoic anhydride Manufacturer: Bayer AG
G 7=Malonic acid Manufacturer: Feinchemikalien
G 8=Oxalacetic acid Manufacturer: Feinchemikalien
G 9=Tetryl
G 10=Hexogen
G 11=Octogen
G 12=Expancel Manufacturer: Akzo Nobel
G 13=Calcium carbonate Manufacturer: Omya GmbH
Friction-reducing additives (lubricants):
R 1=Polyethylene powder (PE wax) Ceridust® from Clariant R 2=Polytetrafluoroethylene powder (PTFE
Teflon powder from Dupont
R 3=Graphite
Powder graphite from Kropfmühle AG
R 4: Molybdenum isulfide
Manufacturer: Dow Corning
CP=Copolymer

TABLE 3

Breakaway and follow-on torques (DIN 267,
part 27) following thermal stressing

| Ex. No. | Tightening torque (LM$_t$) Nm | Breakaway torque (LM$_b$) Component b) absent Nm | Breakaway torque (LM$_b$) Component b) present Nm | Follow-on torque (LM$_f$) Component c) absent Nm | Follow-on torque (LM$_f$) Component c) present Nm | Thermal stressing and time °C. | Thermal stressing and time hours |
|---|---|---|---|---|---|---|---|
| 1 | 40[1) | 117.0 | 70.0 | seized | 1 | 500 | 100.0 |
| 2 | 40[1) | 130.0 | 42.0 | seized | 1 | 500 | 100.0 |
| 3 | 40[1) | 90.0 | 75.0 | seized | 1 | 500 | 100.0 |
| 4 | 46[2) | 125.0 | 90.0 | 760.0 | 15.0 | 220 | 0.5 |
| 5 | 46[2) | 130.0 | 90.0 | 60.0 | 10.0 | 160 | 0.3 |
| 6 | 46[2) | 80 | 65.0 | 50.0 | 8.0 | 170 | 1.5 |
| 7 | 40[1) | 45.0 | 35.0 | 60.0 | 12.0 | 170/500 | 0.5/5 |
| 8 | 46[2) | 42.0 | 30.0 | 40.0 | 5.0 | 155 | 1 |
| 9 | 40[1) | 60.0 | 40.0 | 45.0 | 15.0 | 260 | 2 |
| 10 | none[1) | 31.0 | 16.0 | 20.0 | 12.0 | 230 | 2.0 |
| 11 | none[2) | 33.0 | 20.0 | 18.0 | 1 | 230 | 2.0 |
| 12 | none[2) | 40.0 | 15.0 | 12.0 | 1 | 240 | 2.0 |
| 13 | 46[2) | 63.0 | 48.0 | 31.0 | 12.0 | 250 | 1.5 |

Threaded-part couple:
[1)]Stainless steel/stainless steel
Test bolts: M 10 × 35, A 2-70, DIN 933
Test nuts: M 10, A 2-70, DIN 934
[2)]Steel/steel
Test bolts: M 10 × 35 8.8 (quenched and drawn black steel) DIN 933
Test nuts: M 10, 10 (quenched and drawn black steel) DIN 934

It is evident that when using the coating compositions of the invention the breakaway and follow-on torque and hence also the risk of seizing or jamming of the threaded parts are considerably lower than when using coating compositions without component b) or c).

The invention claimed is:

1. A method of disassembling a socket/pin connection or threaded connection sealed or locked with a set anti-seize composition comprising:
    a) at least one binder selected from the group consisting of
        a1) a curable or cross-linkable monomer containing ethylenically unsaturated groups,
        a2) a curable or cross-linkable polymer or copolymer having chemically reacting groups and being selected from (meth)acrylic resins, epoxy resins, polyurethanes, unsaturated polyesters, polysulfides and silicones,
        a3) a physically setting polymer selected from poly(meth)acrylates, polyesters, polyamides, polyimides, polyurethanes, polycarbonates, polyvinylhalides and copolymers thereof, and
        a4) hydraulically setting inorganic substances,
    b) at least one substance which releases gases at elevated temperature to produce foam structures or porous structures which permit disassembling or tightening said connection, selected from the group consisting of azo compounds, hydrazine derivatives, carboxylic acid and carboxylic acid derivatives, organic peroxo compounds, inorganic carbonates, inorganic hydrogen carbonates and explosive substances,
    c) at least one friction-reducing additive selected from the group consisting of graphite, metal sulfides, polyolefines and fluorinated polyolefins, which comprises exposing said connection at least in part to a temperature at which component (b) releases gases, maintaining the temperature for a period sufficient to reduce the cohesive and, if appropriate, adhesive strength of the set anti-seize composition and disassembling or tightening said connection.

2. The method according to claim 1, wherein component (a2) is selected from the group consisting of (meth) acrylic resins, epoxy resins and polyurethanes containing isocyanate groups.

3. The method according to claim 1 wherein component (a3) is selected from the group consisting of polyamides, saturated polyesters, poly(meth)acrylates and copolymers thereof.

4. The method according to claim 1, wherein component (a4) is selected from water glass, cement, lime and gypsum.

5. The method according to claim 1, wherein component (b) is selected from the group consisting of azo compounds, inorganic carbonates and inorganic hydrogen carbonates.

6. The method according to claim 1, wherein component (b) is selected from the group consisting of azodicarboxamide, malonic acid, sodium carbonate, calcium carbonate, ammonium carbonate, sodium hydrogen carbonate, calcium hydrogen carbonate and ammonium hydrogen carbonate.

7. The method according to claim 1, wherein component (b) is used in microencapsulated form.

8. The method according to claim 1, wherein component (c) is selected from the group consisting of polyethylene, polytetrafluoroethylene, graphite and molybdenum disulfide.

9. The method according to claim 1, wherein the coating composition in addition comprises electrically conductive or thermally conductive substances in the form of fibers, particles, microbeads, hollow microbodies, wires or mixtures thereof.

10. A method of disassembling a socket/pin connection or threaded connection which comprises applying to the socket/pin and threaded-part couples an anti-seize composition comprising:
    a) at least one binder selected from the group consisting of
        a1) a curable or cross-linkable monomer containing ethylenically unsaturated groups,
        a2) a curable or cross-linkable polymer or copolymer having chemically reacting groups and being selected from (meth)acrylic resins, epoxy resins, polyurethanes, unsaturated polyesters, polysulfides and silicones,
        a3) a physically setting polymer selected from poly(meth)acrylates, polyesters, polyamides, polyimides, polyurethanes, polycarbonates, polyvinylhalides and copolymers thereof, and
        a4) hydraulically setting inorganic substances,
    b) at least one substance which releases gases at elevated temperature to produce foam structures or porous structures which permit disassembling or tightening said connection, selected from the group consisting of azo compounds, hydrazine derivatives , carboxylic acid and carboxylic acid derivatives, organic peroxo compounds, inorganic carbonates, inorganic hydrogen carbonates and explosive substances, c) at least one friction-reducing additive selected from the group consisting of graphite, metal sulfides, polyolefines and fluorinated polyolefins, joining sockets and pins or threaded parts, forming a lock or seal in the gap of socket pins or threads by setting the binder, exposing the sealed or locked connections at least in part to a temperature at which component (b) releases gases, maintaining the temperature for a period sufficient to reduce the cohesive and, if appropriate, adhesive strength of the set anti-seize composition and disassembling or tightening said parts.

11. The method according to claim 10, wherein component (a2) is selected from the group consisting of (meth)acrylic resins, epoxy resins and polyurethanes containing isocyanate groups.

12. The method according to claim 10 wherein component (a3) is selected from the group consisting of polyamides, saturated polyesters, poly(meth)acrylates and copolymers thereof.

13. The method according to claim 10, wherein component (a4) is selected from water glass, cement, lime and gypsum.

14. The method according to claim 10, wherein component (b) is selected from the group consisting of azo compounds, inorganic carbonates and inorganic hydrogen carbonates.

15. The method according to claim 10, wherein component (b) is selected from the group consisting of azodicarboxamide, malonic acid, sodium carbonate, calcium carbonate, ammonium carbonate, sodium hydrogen carbonate, calcium hydrogen carbonate and ammonium hydrogen carbonate.

16. The method according to claim 10, wherein component (b) is used in microencapsulated form.

17. The method according to claim 10, wherein component (c) is selected from the group consisting of polyethylene, polytetraflurorethylene, graphite and molybdenum disulfide.

18. The method according to claim 10, wherein the coating composition in addition comprises electrically conductive or thermally conductive substances in the form of fibers, particles, microbeads, hollow microbodies, wires or mixtures thereof.

* * * * *